Sept. 24, 1940.    G. V. RYLSKY ET AL    2,215,565
DRIFT METER
Filed Sept. 17, 1937    2 Sheets-Sheet 1
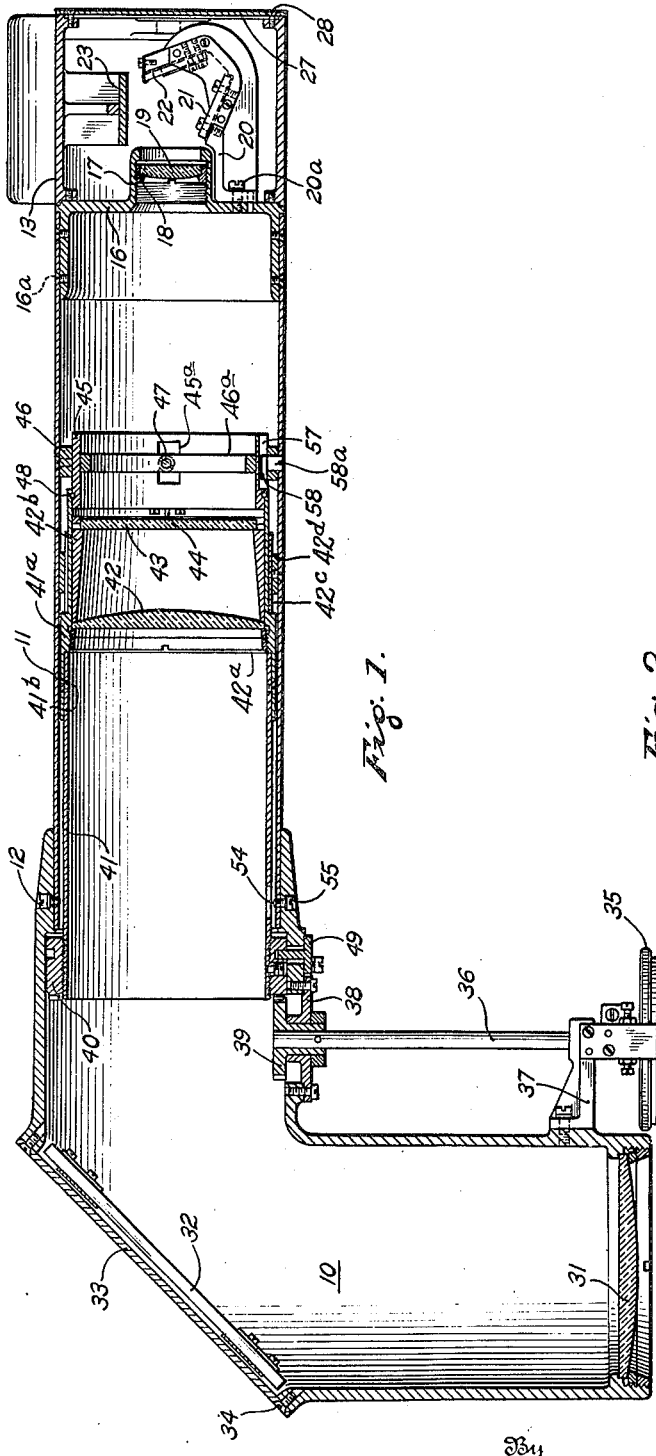
Fig. 1.
Fig. 2.
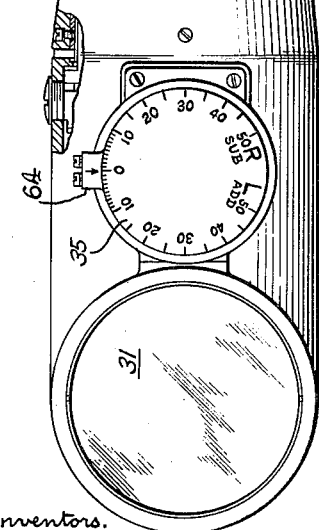
Inventors.
Gregory V. Rylsky
Ladislaw E. Trefny
By Stephen Cerstvik  Attorney.

Sept. 24, 1940. G. V. RYLSKY ET AL 2,215,565
DRIFT METER
Filed Sept. 17, 1937 2 Sheets-Sheet 2
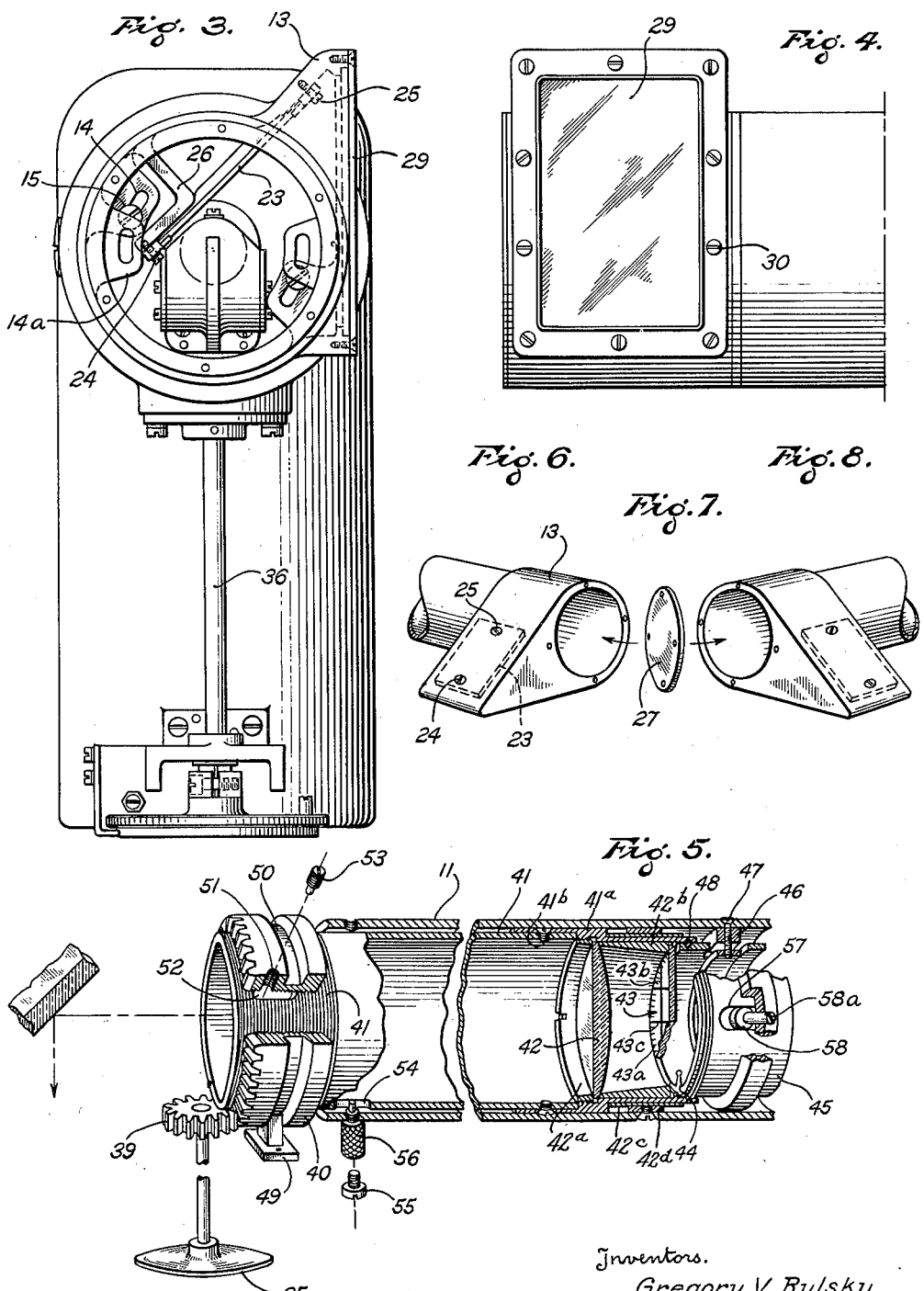
Inventors.
Gregory V. Rylsky
Ladislaw E. Trefny
Stephen Cerstvik Attorney.

Patented Sept. 24, 1940

2,215,565

UNITED STATES PATENT OFFICE 2,215,565

DRIFT METER

Gregory V. Rylsky, New York, and Ladislaw E. Trefny, Corona, Long Island, N. Y., assignors to Bendix Aviation Corporation, South Bend, Ind., a corporation of Delaware Application September 17, 1937, Serial No. 164,406

10 Claims. (Cl. 88—1)

The present invention relates to navigation instruments and more particularly to a device for measuring the drift of an aircraft, and commonly designated as a drift indicator or drift meter.

One of the objects of the present invention is to provide a novel drift meter which may be mounted, if desired, either on the left or the right hand side of the fuselage or body of an aircraft.

Another object is to provide a novel drift meter having a removable head which may be reversed, whereby the drift meter may be arranged for either right or left hand mounting.

A further object is to provide a novel drift meter wherein novel means are provided for adjusting the instrument to obtain a sharp focus while the instrument is in mounted and operative position.

A still further object is to provide a novel drift meter comprising means for adjusting the index of said drift meter while the meter is in mounted and in operative position.

The above and further objects and advantages of the invention will appear more fully hereinafter from a consideration of the detailed description which follows, taken together with the accompanying drawings wherein is illustrated one embodiment of the invention. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views—

Fig. 1 is a plan view, in section, of a device embodying the present invention;

Fig. 2 is a side view, partly in section, illustrating the device of Fig. 1;

Fig. 3 is an end elevation of the device as shown in Fig. 1 with the end plate thereof removed;

Fig. 4 is a partial side view of the device as shown in Fig. 3 illustrating the mounting of one element of said device;

Fig. 5 is a perspective view, partly in section, with part of the device rotated 90 degrees to better illustrate the various parts;

Fig. 6 is a view, in perspective, of the removable head connected to the housing for a left hand mounting, said view being rotated 120 degrees to better illustrate the allocation of the parts;

Fig. 7 is a view, in perspective, of the removable end plate of the removable head; and Fig. 8 is a view, in perspective, of the removable head connected to the housing for a right hand mounting, said view being rotated 120 degrees to better illustrate the positioning of the parts.

Referring to the drawings and more particularly to Fig. 1, the invention is shown as incorporated in a drift meter comprising an L-shaped part 10 connected to the telescope housing 11 by screws 12, said housing carrying at its end a removable hollow, cylindrical head 13 provided with slotted ears 14 (see Fig. 3) cooperating with screws 15 mounted in cylindrical member 16, whereby said head may be rotated to a limited extent. Member 16 is fastened to the telescope housing 11 by screws 16a.

Adjustably mounted in the hub 17 of cylindrical member 16 by means of the adjustable mounting 18 is the objective 19.

Mounted on bracket 20 connected to member 16 by screws 20a are the adjustable mirrors 21 and 22.

Novel means are provided whereby the hollow head 13 may be simply connected to the telescope housing for either right or left hand mounting, as desired, said means comprising, in the present instance, two sets of slotted ears 14, 14a integral with removable head 13 which carries the mirror 23 mounted therein by screws 24 and 25 (see Fig. 3) connected to the bracket 26 and said head 13, respectively. An end plate 27 is fastened in place by screws 28 which may be removed, whereby the end plate may be removed from one end of the head and fastened to the other end of said head so as to close said end when the head is reversed to accommodate a left hand mounting of the telescope housing 11, as is clearly illustrated in Figs. 6, 7 and 8. The ears 14 are used for mounting the head to the telescope housing when a right hand mounting of the drift meter is desired while the ears 14a are utilized when a left hand mounting is desired. A cover glass 29 is sealed to the head 13 and held in place by screws 30 (see Fig. 4) whereby the head 13 is completely closed.

Mounted on one end of the L-shaped part 10 is the eyepiece comprising eyepiece lens 31 which cooperates with a mirror 32 mounted on the inside of cover 33 held in place by suitable means such as screws 34.

A calibrated knob dial 35 cooperating with an index 64 is carried by rod 36 at one end thereof, which rod is mounted for rotation in a bracket 37 and in a removable hub 38. Mounted on the other end of said rod is the gear 39 meshing with the rotatable internally threaded gear member 40 (see Fig. 5), whereby the threaded sleeve members 41 and 41a cooperating therewith and carrying the field lens 42 and reticule 43 held in spaced relation within sleeve 41a by ring 42a and spacer 42b may be rotated within centering elements 42c and 42d with respect to the index carrying member 44 mounted on index carrying member 45 held in place by clamping rings 46 and 46a held together by way of lock screw 47. Reticule 43 is provided with scale means 43a corresponding to the scale of dial 35 and with lines 43b for sighting the device and with lines 43c commonly designated as the timing lines.

Index carrying member 45 is connected to sleeve 41 by means of sleeve 41a fastened by screws 41b to sleeve 41a guiding snap-ring member 48 being mounted in grooves in the member 45 and sleeve 41a, respectively, whereby relative rotation may take place between sleeves 41 and 41a on one hand and index carrying member 45 on the other hand, upon rotation of the knob dial 35. The threaded sleeve 41 carrying field lens 42 and reticule 43 by means of sleeve 41a is rotated with respect to the index carrying member 45 so as to align the image of a ground object with the lines on the reticule. The image of the ground object enters the hollow head through the cover glass 29 and is received and reflected by mirrors 23, 21 and 22, respectively, and thereafter directed to the objective 19 which forms the image of the ground object upon the reticule. The image of the object sighted, co-ordinated with the lines on the reticule and the index, are viewed by the eyepiece comprising the field lens 42, and the eyepiece lens 31, mirror 32 being utilized, when, as disclosed in Fig. 1, the lens 31 must be mounted at right angles to lens 42. In a straight line instrument, mirror 32 is obviously unnecessary. The number of degrees through which the knob dial is rotated, in order to align the direction of apparent movement of the image of the ground object with the lines of the reticule, is a measure of the angle between the desired course of the aircraft and the direction of the actual movement of the craft, whereby the deviation of the craft from a desired course may be obtained. This is the normal operation of the drift meter in sighting objects upon the ground in order to determine the angle of drift. The quantity of drift may be obtained with the apparatus in a manner well known in the art.

Novel means are also provided whereby the field lens and reticule may be moved backward and forward in order to obtain sharp focusing. In the illustrated embodiment said means comprise a key 49 (see Fig. 5) fixedly mounted on the L-shaped part 10 and riding in a groove 50 in the rotatable gear member 40. A threaded hole 51 formed in rotatable gear member 40 leads to a slot 52 in said sleeve 41 whereby the screw 53 threaded into hole 51 may project into slot 52 to lock the sleeve to the rotatable gear member under normal operation. Slot 52 is one of a series of slots in sleeve 41, whereby screws 53 may be aligned with one of said slots upon a slight rotation of member 40.

A second slot 54 is formed in sleeve 41 opposite screw plug 55 which screw plug may be removed and replaced by key pin 56 which enters slot 54 to prevent rotation of sleeve 41 but without hindering longitudinal motion thereof.

When it is desired to focus the field lens more sharply, without disassembling the drift meter device, lock screw 47 (see Fig. 5) which holds the index carrying member 45 locked in place, is loosened, plug screw 55 is removed and replaced by key pin 56, and screw 53 is removed from contact with one of the slots 52. Upon rotation of knob dial 35, gear 39 rotates gear member 40. Gear 40 is prevented from moving longitudinally because of key 49 but by its threaded coaction with sleeve 41 causes a longitudinal movement thereof, rotation of sleeve 41 being prevented by key pin 56 projecting into slot 54 said slot being long enough, however, to permit longitudinal movement of said sleeve member.

By movement of the sleeve member 41 back and forth, the field lens 42 and reticule 43 are moved back and forth until the proper position for the sharpest image is found. Lock screw 47 is then tightened to lock the index member 45 in place, key pin 56 is removed, plug screw 55 is replaced, and screw 53 is screwed into contact with one of the slots 52, whereby the device is returned to its condition of normal operation.

Novel means are further provided whereby the index 44 may be adjusted and for this purpose there is provided a slot 57 formed in index carrying member 45 cooperating with a cam member 58 mounted for rotatable movement by means of a shaft provided with a slotted head 58a extending through an opening in the wall of the housing. The cam member 58 projects into and co-operates with the sides of said slot 57.

The index carrying member 45 may be rotated to provide a fine adjustment of the position of the index 44 while the drift meter is in operative position, by rotating cam member 58 by means of a screw driver or the like inserted into the slotted head 58a of said cam 58, whereby the member 45 is rotated about its longitudinal axis, the guide snap ring 48 permitting relative rotation between the threaded sleeve 41 and the index carrying member 45. During the fine adjustment, screw 47 remains in place holding clamping rings 46 and 46a together while the slot 45a (Fig. 1) formed in index carrying member 45 permits relative rotation of member 45 with respect to the lock screw 47 and clamping rings 46 and 46a.

There is thus provided a novel drift meter embodying novel means whereby the instrument may be mounted in any position desired on an aircraft, by a simple reversal of the head piece. Novel means are also provided whereby the parts of the device may be focused and finely adjusted while in operative position.

Although but one embodiment of the invention has been illustrated and described, further changes and modifications in form, material and relative arrangement of parts, which will now appear to those skilled in the art, may be made without departing from the scope of the invention. Reference is, therefore, to be had to the appended claims for a definition of the limits of the invention.

What is claimed is:

1. In a device of the character described, an eyepiece lens, a telescope housing, a removable head comprising a hollow member, said head and said eyepiece lens being connected to said housing at opposite ends thereof, a window mounted in said head and sealing the same, mirror means located within said head and in optical alignment with said window and with each other, an objective mounted in said housing, a field lens and reticle spaced from said objective and mounted for longitudinal movement with respect thereto, an index carrying member mounted for rotation about the axis of said housing, an index carried by said member and within the optical field of said lens, means exposed exteriorly of said device and connected to said field lens for adjusting the longitudinal position of said field lens and means exposed exteriorly of said device and connected to said index carrying member for adjusting the rotational position of said index carrying member while said device is in operative position.

2. In a device of the character described, a hollow cylindrical shaped housing, an objective mounted in one end thereof, a series of mirrors, means connecting certain of said mirrors to said housing, a cylindrical element forming a head for connection to said housing, a mirror connected to said head whereby light is received from a ground object and transmitted to said certain mirrors in seriatim, an opening in said head sealed by a window, two sets of ears at the open ends of said cylindrical element whereby either end of said element may be connected to said housing, means connecting one of said sets to said housing, a removable end piece sealing the end of said element opposite to the end connected to said housing, and means for connecting said end piece to the opposite end of said element when said element is connected to said housing upon the reversal of the position of said housing.

3. In a device of the character described, a hollow housing, an L-shaped tubular observation piece connected to said housing, a knob dial, a shaft rotatably mounted on said piece connected to said dial at one end and carrying a gear at the other end thereof, a first hollow threaded member internested with said housing carrying a field lens and reticle, a second hollow threaded member mounted for rotation about said first member, said gear meshing with said second member for rotation thereof, an opening in each of said members, and disconnectable means insertable into said openings for locking said first and second threaded members for simultaneous rotation, and removable means cooperating with said housing and first member whereby said first member may be locked against rotation to produce longitudinal movement thereof upon rotation of said second member when said disconnectable locking means are disconnected.

4. In combination with an aircraft, a drift meter mounted for projection from the right hand side of said craft, a removable head connected to said drift meter, comprising a hollow cylindrical member open at both ends, a window in a side wall of said member, mounting means adjacent each of the peripheries of said open ends and means on said drift meter cooperating with said mounted means whereby said member may be reversibly mounted end for end on said drift meter for either right hand or left hand mounting of said drift meter, a removable cover closing one end of said member, and means on said member cooperating with fasteneing means whereby said cover may be attached to the other end of said member when said drift meter is changed from a right hand to a left hand mounting.

5. In a device of the character described, a casing, optical means enclosed by said casing whereby light rays received from an object on the ground may be directed into said casing, an index, a field lens, a reticle carrying a scale, said index being located within the optical field of said lens, means receiving said light and forming an image on said reticle, means for rotating said lens and reticle with respect to said said image comprising, a knob dial whose scale conforms to the scale of said reticle, a rod carried by said dial for rotation therewith, a hollow threaded member mounted for rotation in said housing, means for transmitting the motion of said knob dial to said member consisting of an internested hollow member, means locking said internested members for simultaneous rotation, means for releasing said locking means, and means coacting with one of said internested members whereby the rotational movement transmitted to one of said internested members from said knob dial is transformed into longitudinal movement of said other internested member, said field lens and reticle being connected to said other member whereby said field lens may be focused with respect to said optical means and means cooperating with said field lens for optically viewing said reticle.

6. In a drift meter, a telescope housing, a removable head comprising a hollow member having open ends and being connected to said housing at one of its ends. means formed with said head between said ends for transmitting light rays from the exterior of said head to the interior thereof, mirror means arranged in said hollow member for directing said light-rays to the interior of said housing, an end plate removably connected to the other end of the removable head for sealing the open end thereof, and means for connecting said plate to the first-named end of said head for sealing the open end thereof upon reversal of the connection of said head to said housing when the latter is reversed in position.

7. In a navigation instrument, a telescope housing, a removable head comprising a hollow member having open ends provided with a triangular extension and provided with means adjacent each end for selectively connecting the hollow member to said housing at one of its ends, said extension having a portion thereof adapted for transmitting light rays from the exterior of said head to the interior thereof, mirror means carried by said housing and enclosed by said head, a second mirror means in the optical field of said first mirror means and connected to said head for removal therewith, the mirrors coacting to direct the light from the exterior into the housing, a removable end piece closing one end of said head, attaching means on the member for said end piece, and means for attaching said end piece to the other end of said head when the latter is mounted in reverse position on said housing.

8. In a navigation instrument of the character described, a housing enclosing a field lens and a reticle, an index in the optical field of said lens mounted within said housing, means connected to said housing for directing light rays into the instrument from ground objects, and means in said housing to form images of said ground objects on said reticle, a mirror mounted in the optical field of said field lens, an eye-piece lens mounted to receive the light reflected by said mirror, means carrying said index comprising a rotatable member provided with a slot portion and mounted in said housing, clamping means including a pair of rings surrounding said member at the outer and inner periphery thereof for normally maintaining said rotatable member against longitudinal movement with respect to said housing, and cam means rotatably mounted in the side of said housing adapted to engage said slot and force rotation of said index carrying member relative to said clamping means, field lens, reticule and housing.

9. In a device of the character described, a first mirror means for directing light rays into said device from a ground object, a reticule, means receiving said light rays and forming an image of said object on said reticule, a field lens spaced from said reticule on the opposite side thereof from said first mirror means, a second mirror means disposed on one side of said field lens for reflecting the light rays received from said field lens, an eye-piece lens for viewing said last-named mirror, means for rotating said reticule and field lens to align a portion of said reticule with said ground object, said rotating means comprising a tubular member mounted for rotation provided at one end with means carrying said field lens and said reticule, said tubular member further being provided with a slot at the periphery thereof, a toothed member mounted for rotation engaging said tubular member for rotatable movement therewith, and means for engaging the slot of said tubular member preventing rotation of the tubular member and translating the rotatable movement of said toothed member into longitudinal movement of said tubular member.

10. In a device of the character described, a casing enclosing an optical system for receiving light rays from a ground object and forming an image of said object, an index in the optical field of said system, means carrying said index comprising a rotatable member provided with slot portions and mounted in said housing, clamping means comprising a pair of rings surrounding said member and a removable member disposed within one of said slot portions for connecting said rings to each other and to said casing for normally maintaining said rotatable member against longitudinal movement with respect to said casing but permitting limited rotatable movement thereof, and cam means rotatably mounted in a side of said casing adapted to engage the other of said slot portions to force rotation of said index carrying member relative to said casing.

GREGORY V. RYLSKY.
LADISLAW E. TREFNY.